(12) United States Patent
Yang et al.

(10) Patent No.: US 12,315,066 B2
(45) Date of Patent: May 27, 2025

(54) GRAPHICS PROCESSING METHOD AND SYSTEM

(71) Applicant: INNOSILICON MICROELECTRONICS (ZHUHAI) CO., LTD., Zhuhai (CN)

(72) Inventors: Xile Yang, Zhuhai (CN); Hai Ao, Zhuhai (CN)

( * ) Notice: Subject to any disclaimer, the term of this patent is extended or adjusted under 35 U.S.C. 154(b) by 236 days.

(21) Appl. No.: 18/190,084

(22) Filed: Mar. 25, 2023

(65) Prior Publication Data

US 2024/0070962 A1 Feb. 29, 2024

Related U.S. Application Data

(63) Continuation of application No. PCT/CN2022/140670, filed on Dec. 21, 2022.

(30) Foreign Application Priority Data

Aug. 23, 2022 (CN) .......................... 202211013176.1

(51) Int. Cl.
*G06T 15/00* (2011.01)
(52) U.S. Cl.
CPC ................................ *G06T 15/005* (2013.01)
(58) Field of Classification Search
CPC ................................................... G06T 15/005
See application file for complete search history.

(56) References Cited

U.S. PATENT DOCUMENTS

| | | | | |
|---|---|---|---|---|
| 2022/0122566 | A1* | 4/2022 | Schluessler | G09G 5/18 |
| 2023/0334749 | A1* | 10/2023 | Livesley | G06T 15/005 |
| 2023/0410246 | A1* | 12/2023 | Pennala | G06T 11/40 |
| 2024/0008066 | A1* | 1/2024 | Sarma | H04W 72/23 |
| 2024/0185376 | A1* | 6/2024 | King | G06T 15/005 |
| 2024/0411717 | A1* | 12/2024 | Koker | G06F 12/0862 |

FOREIGN PATENT DOCUMENTS

CN 112017104 A 12/2020

\* cited by examiner

*Primary Examiner* — Kee M Tung
*Assistant Examiner* — Khoa Vu

(57) ABSTRACT

A graphics processing method and system are disclosed. The system includes multiple cores with a master mode core and at least one slave mode core, where the master mode core is configured to construct primitives according to input geometry data, split the constructed primitives into primitive core groups, and distribute the primitive core groups to the master mode core and the at least one slave mode core; and the master mode core and the at least one slave mode core are configured to process the distributed primitive core groups to obtain a rendered image. The system and method of the present disclosure provide powerful parallel data processing capability, which allows for processing of a massive amount of geometry data, and enable excellent performance by taking actual working states of hardware into full consideration.

20 Claims, 5 Drawing Sheets

GRAPHICS PROCESSING METHOD AND SYSTEM

RELATED APPLICATIONS

This application is a bypass continuation of International Application No. PCT/CN2022/140670, filed on Dec. 21, 2022, which claims priority to Chinese Patent Application No. 202211013176.1 filed on Aug. 23, 2022. The disclosures of the prior applications are hereby incorporated by reference in their entirety.

TECHNICAL FIELD

The present disclosure relates to the technical field of image processing, and more particularly, to a graphics processing method and system.

BACKGROUND

Computer graphics processing systems are designed to process graphics data (including primitive data and vertex data) from computer graphics applications, such as computer games, and output rendered images generated through a rendering pipeline.

A three-dimensional (3D) model in a graphics application is set up by splitting objects in a scene using primitives (including, but not limited to, triangles, lines, and points, for example) which are defined by vertices for their positions in the three-dimensional space, as well as lighting effects and shading properties. Geometry data of primitives and vertices of the 3D model are sent as an input data stream for the geometry processing phase of the rendering process to a computer graphics processing system, and then the input primitives are subject to geometry processing, which includes transforming the primitives into screen space and removing primitives that are not visible in the screen space. After the geometry processing, the geometry data of primitives and vertices are sent to a fragment processing pipeline to be rendered in the computer graphics processing system. As a result of the rendering processing, an output image from the 3D model is generated by the computer graphics processing system and displayed on a display unit (e.g., a display screen).

The existing computer graphics processing systems include tile-based rendering mode. In tile-based rendering mode, the screen is divided into rectangular tiles, and primitives, after being subject to geometry processing, are sorted into different tiles on the screen, and then fragment processing is performed in each tile on the screen separately. In the existing multi-core tile-based rendering computer graphics processing system technology, parallel tile processing simultaneously in multiple cores on multiple tiles is performed only in the fragment processing phase, which provides limited improvement on the system performance. However, with the increasing complexity of graphics processing content, it is necessary to further improve the performance of computer graphics processing systems.

SUMMARY

In view of the above defects or need for improvement of the prior art, the present disclosure proposes a graphics processing method and system. The method and system provide powerful parallel data processing capability, which allows for processing of a massive amount of geometry data, and enable excellent performance by taking actual working states of hardware into full consideration.

In order to achieve the above objective, according to one aspect of the present disclosure, there is provided a graphics processing system including multiple cores with a master mode core and at least one slave mode core, where the master mode core is configured to construct primitives according to input geometry data, split the constructed primitives into primitive core groups, and distribute the primitive core groups to the master mode core and the at least one slave mode core; and the master mode core and the at least one slave mode core are configured to process the distributed primitive core groups to obtain a rendered image.

In some embodiments, each of the multiple cores includes a geometry processing system and a fragment processing system, where the geometry processing system of each of the multiple cores is configured to process the distributed primitive core groups to generate tiling display lists for tiles; and for each tile, the fragment processing system of each of the multiple cores is configured to merge the tiling display lists generated by the geometry processing systems of the multiple cores into one single tiling display list, and render the tile according to the merged tiling display list to obtain the rendered image.

In some embodiments, the number of the multiple cores is n, and there exists at least one tile having n tiling display lists being generated by the geometry processing systems of the n cores, respectively.

In some embodiments, the number of the multiple cores is n, and there exists at least one tile having less than n tiling display lists being generated by the geometry processing systems of some of the n cores, respectively.

In some embodiments, the geometry processing system of each of the multiple cores includes an input assembler module, at least one geometry processing pipeline, and a tiling module, where
  the input assembler module of the master mode core is configured to construct the primitives according to the input geometry data, split the constructed primitives into the primitive core groups, and distribute the primitive core groups to the input assembler module of each of the multiple cores;
  the input assembler module of each of the multiple cores is configured to send the distributed primitive core groups to the corresponding at least one geometry processing pipeline;
  the at least one geometry processing pipeline of each of the multiple cores is configured to process the distributed primitive core groups to make sure all primitives of the primitive core groups are in screen view space; and
  the tiling module of each of the multiple cores is configured to tile the primitive core groups from the corresponding at least one geometry processing pipeline into multiple tiles in the screen view space, and generate a tiling display list for each tile.

In some embodiments, the input assembler module of each of the multiple cores includes a data processing module, a primitive stream manager, and a data distribution module, where the primitive stream manager of each of the multiple cores includes a frontend module and a backend module;
  the data processing module of the master mode core is configured to construct primitives according to the input geometry data to form a primitive stream;
  the frontend module of the master mode core is configured to split the primitive stream into primitive core groups and distribute the primitive core groups to the backend module of the master mode core and the backend module of the at least one slave mode core;

the data distribution module of the master mode core is configured to send the primitive core groups acquired by the backend module of the master mode core to the at least one geometry processing pipeline of the master mode core; the data distribution module of the at least one slave mode core is configured to send the primitive core groups acquired by the backend module of the at least one slave mode core to the at least one geometry processing pipeline of the at least one slave mode core; and the data processing module and the frontend module of the at least one slave mode core are in an inactive state.

In some embodiments, during the splitting of the primitives into the primitive core groups, a current primitive core group is closed and a new primitive core group is started, in response to the number of primitives in the current primitive core group reaching a predefined core group primitive limit, or in response to a change of the value of the core group primitive limit, or in response to the number of geometry tasks in the current primitive core group reaching a predefined core group geometry task limit, or in response to a change of the value of the core group geometry task limit.

In some embodiments, the primitive core groups are distributed to each of the multiple cores in order; or each of the primitive core groups is distributed to the core with the greatest combined weight factor among the multiple cores, where the combined weight factor is determined according to input and output capabilities of the at least one geometry processing pipeline of the core.

In some embodiments, the combined weight factor of a j-th core is $W_j = k_{jin} * W_{jin} + k_{jout} * W_{jout}$, where $W_{jin}$ denotes a weight factor of the j-th core from vertex input capability of the at least one geometry processing pipeline, $W_{jout}$ denotes a weight factor of the j-th core from vertex output capability of the at least one geometry processing pipeline, and $k_{jin}$ and $k_{jout}$ denote predefined coefficients for $W_{jin}$ and $W_{jout}$, respectively.

In some embodiments, $W_{jin} = \Sigma_{i=1}^{i=m} S_{ini}$, and $W_{jout} = \Sigma_{i=1}^{i=m} S_{outi}$, where $S_{ini}$ denotes the capability for an i-th geometry processing pipeline to accept new input geometry data, $S_{outi}$ denotes the capability for the i-th geometry processing pipeline to accept output geometry data during geometry transformation and other pipeline stages, and m denotes the number of geometry processing pipelines that the j-th core includes.

In some embodiments, the input assembler module of the master mode core is configured to add a core group index to each of the primitive core groups, and the tiling display lists contain the core group indexes.

In some embodiments, the geometry processing pipeline of each of the multiple cores includes a geometry transformation module, a clipping and culling module, and a data receiving module, where the geometry transformation module of each of the multiple cores is configured to process the distributed primitive core groups to transform vertex data of the primitives into the screen view space;

the clipping and culling module of each of the multiple cores is configured to update the primitive core groups by removing primitives invisible in the screen view space; and the data receiving module of each of the multiple cores is configured to receive and store the updated primitive core groups and the transformed vertex data.

In some embodiments, the fragment processing system of each of the multiple cores includes a tile processing module, where the tile processing module is configured to acquire the tiling display lists from the master mode core and the at least one slave mode core, and merge the acquired tiling display lists into one single tiling display list in an original distribution order for each tile according to the core group indexes in the acquired tiling display lists; and the fragment processing system of each of the multiple cores is configured to render the tile according to the merged tiling display list to obtain the rendered image.

In some embodiments, the core group indexes are configured to split a stream of the constructed primitives into the primitive core groups, and the core group indexes are incremental integers.

In some embodiments, the tile processing module is configured to keep tracking core group indexes in all the tiling display lists, take a tiling display list with the lowest core group index value as a current tiling display list, and process the current tiling display list until a next tiling display list entry of the current tiling display list is either a new core group index entry or a terminator entry.

In some embodiments, in response to a new core group index entry appearing in the current tiling display list, the tile processing module is further configured to compare the values of the core group indexes in all the tiling display lists, take a tiling display list currently with the lowest core group index value as a current tiling display list, and process the current tiling display list until a next tiling display list entry of the current tiling display list is either a new core group index entry or a terminator entry.

In some embodiments, in response to a terminator entry appearing in the current tiling display list, the tile processing module is further configured to compare the values of core group indexes in all the other tiling display lists, take a tiling display list currently with the lowest core group index value as a current tiling display list, and process the current tiling display list until a next tiling display list entry of the current tiling display list is either a new core group index entry or a terminator entry.

In some embodiments, the fragment processing system of each of the multiple cores further includes a rasterization module, a hidden surface removal module, a pixel shading module, and a post-processing module, where the rasterization module is configured to rasterize primitives referenced in the merged tiling display list into visible pixels;

the hidden surface removal module is configured to perform a depth test by comparing depth values of the primitive pixels output by the corresponding rasterization module with depth values of previous primitive pixels, and remove a primitive pixel when the primitive pixel is hidden by the previous primitive pixel, or otherwise, send the primitive pixel to the corresponding pixel shading module;

the pixel shading module is configured to shade the primitive pixels output by the corresponding hidden surface removal module;

the post-processing module is configured to perform post-processing operations, which involve at least accumulation, on colors generated from the shaded primitive pixels; and the fragment processing system is configured to generate a final rendered image for each tile after processing all the primitives in the merged tiling display list.

According to another aspect of the present disclosure, there is provided a graphics processing method, including:

constructing primitives according to input geometry data, and splitting the constructed primitives into primitive core groups; distributing the primitive core groups to multiple cores; and processing the distributed primitive core groups in the multiple cores, respectively, to obtain a rendered image.

In some embodiments, the processing the distributed primitive core groups in the multiple cores, respectively, to obtain a rendered image includes:
tiling the distributed primitive core groups into multiple tiles in screen view space and generating a tiling display list for each tile in each of the multiple cores;
merging, for each tile, the tiling display lists generated in the multiple cores into one single tiling display list; and
rendering the tile according to the merged tiling display list to obtain the rendered image.

In some embodiments, the number of the multiple cores is n, and there exists at least one tile having n tiling display lists being generated by the geometry processing systems of the n cores, respectively.

In some embodiments, the number of the multiple cores is n, and there exists at least one tile having less than n tiling display lists being generated by the geometry processing systems of some of the n cores, respectively.

In some embodiments, the tiling the distributed primitive core groups into multiple tiles in screen view space includes: processing the distributed primitive core groups to have all primitives of the primitive core groups are in screen view space; and tiling the processed primitive core groups into multiple tiles in the screen view space.

In some embodiments, the splitting the constructed primitives into primitive core groups includes: adding a core group index to each of the primitive core groups; where the tiling display lists contain the core group indexes.

In some embodiments, the merging, for each tile, tiling display lists generated in the multiple cores into one single tiling display list includes: acquiring the tiling display lists generated in the multiple cores; and merging the acquired tiling display lists into one single tiling display list in an original distribution order according to core group indexes in the acquired tiling display lists.

In some embodiments, the core group indexes are incremental integers, and the merging the acquired tiling display lists into one single tiling display list in an original distribution order according to core group indexes in the acquired tiling display lists includes: taking a tiling display list with the lowest core group index value as a current tiling display list, and process the current tiling display list until a next tiling display list entry of the current tiling display list is either a new core group index entry or a terminator entry.

In some embodiments, in response to a new core group index entry appearing in the current tiling display list, the merging the acquired tiling display lists into one single tiling display list in an original distribution order according to core group indexes in the acquired tiling display lists further includes: comparing the values of the core group indexes in all the tiling display lists, taking a tiling display list currently with the lowest core group index value as a current tiling display list, and processing the current tiling display list until a next tiling display list entry of the current tiling display list is either a new core group index entry or a terminator entry.

In some embodiments, in response to a terminator entry appearing in the current tiling display list, the merging the acquired tiling display lists into one single tiling display list in an original distribution order according to core group indexes in the acquired tiling display lists further includes: comparing the values of core group indexes in all the other tiling display lists, taking a tiling display list currently with the lowest core group index value as a current tiling display list, and processing the current tiling display list until a next tiling display list entry of the current tiling display list is either a new core group index entry or a terminator entry.

In some embodiments, the rendering the tile according to the merged tiling display list to obtain the rendered image includes: rasterizing primitives referenced in the merged tiling display list into visible pixels; performing a depth test by comparing depth values of the primitive pixels with depth values of previous primitive pixels, and removing the primitive pixels hidden by the previous primitive pixels; shading the remaining primitive pixels; and performing post-processing operations, which involve at least accumulation, on colors generated from the shaded primitive pixels.

In some embodiments, the splitting the constructed primitives into primitive core groups includes: closing a current primitive core group and starting a new primitive core group in response to a predefined condition being satisfied, where
the predefined condition is that the number of primitives in the current primitive core group reaches a predefined core group primitive limit, or the value of the core group primitive limit is changed, or the number of geometry tasks in the current primitive core group reaches a predefined core group geometry task limit, or the value of the core group geometry task limit is changed.

In some embodiments, the distributing the primitive core groups to multiple cores includes: distributing the primitive core groups to each of the multiple cores in order; or distributing each of the primitive core groups to the core with the greatest combined weight factor among the multiple cores, where the combined weight factor is determined by the input and output capabilities of the at least one geometry processing pipeline of the core.

According to another aspect of the present disclosure, there is provided an electronic device, including the graphics processing system described above.

According to another aspect of the present disclosure, there is provided an electronic device, including: a processor, and a memory communicatively connected to the processor; where the memory stores instructions executable by the processor and the processor implements the graphics processing method described above by executing the instructions.

According to another aspect of the present disclosure, there is provided a computer-readable storage medium storing computer instructions, where the computer instructions implement the graphics processing method when executed by a processor.

Overall, the above technical solutions conceived in the present disclosure have the following beneficial effects compared to the prior art. In the geometry processing phase, the input data are distributed to multiple cores for parallel and cooperative processing, so that the data processing capability of the system can be significantly improved and thus massive geometry data can be processed, thereby avoiding the performance bottleneck in the processing of massive geometry data; a primitive stream manager (PSM) is added into the input assembler module, and the PSM fully considers various factors (e.g., dynamically distributed input primitive data) within a graphics processing unit (GPU) during task distribution and can thus distribute tasks in a more rational and efficient manner (e.g., providing different allocation manners), and the actual workload of hardware can be reflected more accurately, which helps achieve the optimal performance; and each of the cores has a separate display list, and each display list has a separate memory space, so that the waiting time across the cores for merging the display lists can be shortened, and data blocking caused by waiting can be prevented.

DETAILED DESCRIPTION

In order to make the objectives, technical solutions and advantages of the present disclosure more apparent, the present disclosure is further described in detail in conjunction with the accompanying drawings and embodiments. It should be understood that the specific embodiments described here are intended only to explain the present disclosure and are not intended to limit the present disclosure. As will be appreciated by those skilled in the art, the embodiments described may be modified in various manners without departing from the principle or scope of the present disclosure. Therefore, the accompanying drawings and descriptions are regarded as illustrative in nature rather than restrictive.

In order to further improve the performance of a computer graphics processing system, multiple computer graphics processing cores may be combined into one multi-core system, where the cores of the multi-core system can work in a master mode or a slave mode. In the geometry processing phase, the input data are distributed to multiple cores for parallel and cooperative processing, so that the data processing capability can be significantly improved and thus massive geometry data can be processed, thereby avoiding the performance bottleneck in the processing of massive geometry data.

Figure 1:
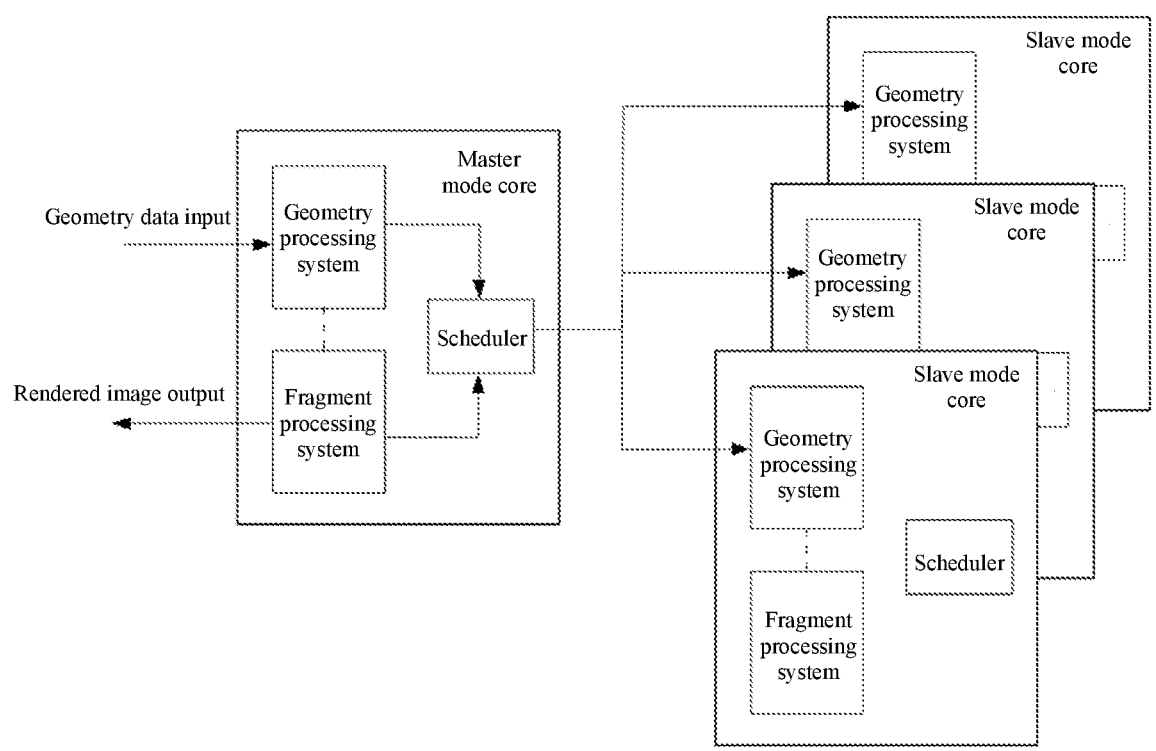
FIG. 1 is a schematic diagram of a multi-core computer graphics processing system for tile-based rendering mode according to an embodiment of the present disclosure.

As shown in FIG. 1, the multi-core computer graphics processing system for tile-based rendering mode according to an embodiment of the present disclosure includes 4 cores, each of which includes a geometry processing system, a fragment processing system, and a scheduler. One of the cores works in the master mode, and is thus called a master mode core, while the remaining three cores work in the slave mode and are thus called slave mode cores. The master mode core is connected to the three slave mode cores separately.

The master mode core is configured to construct primitives according to input geometry data (e.g., vertex data), split the constructed primitives into primitive core groups, and distribute the primitive core groups to the master mode core and the slave mode cores. The master mode core and the slave mode cores then process the distributed primitive core groups to obtain and output a rendered image. Here, a primitive core group refers to a group of primitives allocated to a core.

Specifically, the geometry processing system of the master mode core constructs primitives according to the input geometry data, splits the constructed primitives into separate primitive core groups having rendering state data and distributes the primitive core groups to the geometry processing system and the scheduler of the master mode core. That is, some of the primitive core groups are left in the geometry processing system of the master mode core for subsequent processing, and the other primitive core groups are sent to the scheduler. The scheduler of the master mode core further distributes its distributed primitive core groups to the geometry processing systems of each of the slave mode cores according to the number of the slave mode cores defined in the system configuration.

The geometry processing systems of the master mode core and the slave mode cores process the distributed primitive core groups, tile the distributed primitive core groups into multiple tiles in screen view space, and generate a tiling display list for each tile. In some embodiments, the tiling display list contains all primitives that overlap at least partially with the tile and hence need to be rendered in the tile. The fragment processing system of the master mode core renders the tile according to the tiling display lists for the tile that are generated by the geometry processing systems of the master mode core and the slave mode cores to obtain the final rendered image; and the fragment processing systems of the slave mode cores render the tile according to the tiling display lists for the tile that are generated by the geometry processing systems of the master mode core and the slave mode cores to obtain the final rendered image.

Figure 2:
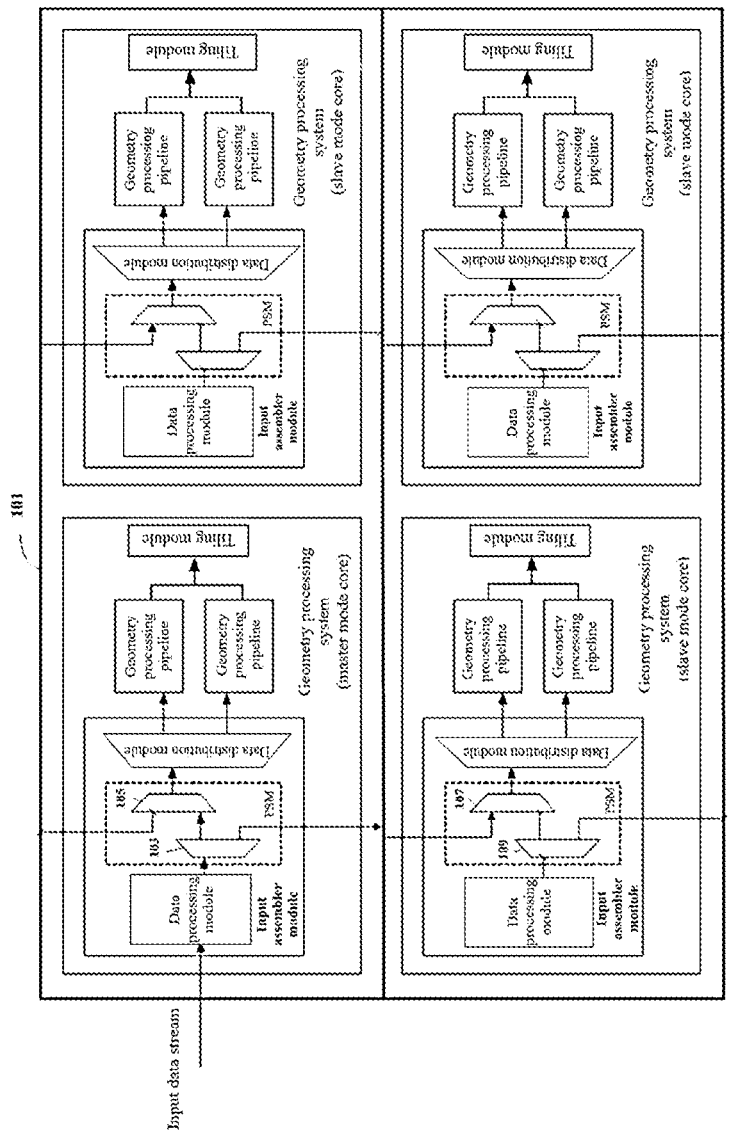
FIG. 2 is a schematic diagram of geometry processing systems of a master mode core and slave mode cores according to an embodiment of the present disclosure.

FIG. 2 provides a schematic diagram of geometry processing systems of a master mode core and slave mode cores according to an embodiment of the present disclosure. As shown in FIG. 2, each geometry processing system includes an input assembler module and a geometry processing pipeline. The input assembler module of the master mode core is configured to receive an input data stream, i.e., input geometry data (e.g., vertex data), construct primitives according to the input geometry data to form a primitive stream, and split the primitive stream into separate primitive core groups having rendering state data, and distribute the primitive core groups to the master mode core and the slave mode cores, and the master mode core and the slave mode cores further allocate the distributed primitive core groups to downstream geometry processing pipelines.

Further, as shown in FIG. 2, in the geometry processing systems of the master mode core and the slave mode cores, the input assembler module further includes a data processing module, a primitive stream manager (PSM), and a data distribution module connected in sequence.

The data processing module of the master mode core is configured to receive the input data stream and construct primitives according to the input data stream to form a primitive stream; and the PSM of the master mode core is configured to split the primitive stream into separate primitive core groups having rendering state data, and distribute the primitive core groups to the master mode core and the slave mode cores. Specifically, a frontend module 103 of the PSM of the master mode core is configured to split the primitive stream into separate primitive core groups having rendering state data and send the primitive core groups to a backend module 105 of the PSM of the master mode core and the scheduler of the master mode core, respectively. The scheduler of the master mode core further distributes the distributed primitive core groups to backend modules 107 of the PSMs of the slave mode cores via inter-core connection 101 according to the number of the slave mode cores determined in the system configuration. In the master mode core, the primitive core groups reach the data distribution module through the backend module 105. The data distribution module of the master mode core is configured to allocate the distributed primitive core groups to the downstream geometry processing pipelines.

The data processing module of the slave mode core and frontend module 109 of the PSM of the slave mode core are in an inactive state, the PSM of the slave mode core receives the distributed primitive core groups from the scheduler of the master mode core via the inter-core connection 101. That is, the backend module 107 of the slave mode core receives the distributed primitive core groups from the scheduler of the master mode core via the inter-core connection 101. In the slave mode core, the primitive core groups reach the data distribution module through the backend module 107. The data distribution module of the slave mode core is configured to further allocate the distributed primitive core groups to the downstream geometry processing pipelines.

In some embodiments, a configuration parameter, i.e. a core group geometry task limit (e.g., CG_GEOMETRY_TASK_LIMIT), is introduced to control the number of geometry tasks in a primitive core group. The configuration parameter CG_GEOMETRY_TASK_LIMIT is added either as a global register or a render state word. This parameter may be used by the input assembler module in the master mode core to split the primitive stream into different primitive core groups for use in geometry processing pipelines in all cores of the multi-core computer graphics processing system for tile-based rendering mode. The configuration parameter CG_GEOMETRY_TASK_LIMIT defines the maximum number of geometry tasks that can be sent into the geometry processing pipelines of each core. After the number of geometry tasks in the geometry processing pipelines of the core reaches this value, a new primitive core group is started. Geometry tasks are tasks that are sent from the input assembler module to the geometry processing pipelines, including primitives and rendering state update, etc., and the number of the geometry tasks processed can be counted in the geometry processing pipeline.

In some embodiments, the mechanism for determining primitive core group switching in the PSM is as follows:
(1) after a primitive core group is started, the PSM counts the total number of geometry tasks sent to the active geometry processing pipelines in each core;
(2) when the total number of geometry tasks is greater than or equal to CG_GEOMETRY_TASK_LIMIT and the PSM is processing a primitive task, the PSM sends primitives to the downstream geometry processing pipelines and then closes the current primitive core group; and
(3) when the number of geometry tasks is greater than or equal to CG_GEOMETRY_TASK_LIMIT and the PSM is not processing a primitive task, the PSM closes the current primitive core group.

The splitting of primitive core groups using the core group geometry task limit can make it necessary for the PSM to close the current primitive core group in some cases. For example, when the total number of geometry tasks in the primitive core group is greater than or equal to CG_GEOMETRY_TASK_LIMIT, the current primitive core group is closed and a new primitive core group is started; and for another example, a change in the value of CG_GEOMETRY_TASK_LIMIT causes the current primitive core group to be closed and a new primitive core group to be started. Since the geometry task count is based on primitives and rendering state data, there is no need to start a new primitive core group just due to rendering state change.

Since CG_GEOMETRY_TASK_LIMIT is the only parameter for splitting the primitive stream into primitive core groups, this scheme one is simple and easy to implement, but it may not be very flexible for primitive stream distribution. It can be understood that the optimum value of the geometry task limit set as CG_GEOMETRY_TASK_LIMIT may be determined through experiments to achieve the optimum performance of the multi-core computer graphics processing system for tile-based rendering mode.

In some embodiments, a configuration parameter, i.e. a core group primitive limit (e.g., CG_PRIMITIVE_LIMIT), is introduced to control the number of primitives sent to the cores by the PSM in the master mode core. The value of CG_PRIMITIVE_LIMIT may be set as a geometry processing state by a software driver. In an embodiment of the present disclosure, it may be set individually for each draw primitive command or may be shared among multiple draw primitive commands. In the master mode or the slave mode, CG_PRIMITIVE_LIMIT is the maximum number of primitives in a primitive core group to be processed in geometry processing pipelines of a core.

By leaving the setting control to the software driver, this scheme two can balance the distribution of geometry workload more flexibly. For example, the software driver may choose to set a smaller CG_PRIMITIVE_LIMIT for a primitive stream with complex shader instructions in the geometry processing phase and a larger CG_PRIMITIVE_LIMIT for a primitive stream with simple shader instructions in the geometry processing phase.

The splitting of primitive core groups using the core group primitive limit can make the PSM in the master mode core to close the current primitive core group and start new primitive core groups for different cores in some cases. For example, when the number of primitives in the primitive core group is equal to the value of CG_PRIMITIVE_LIMIT, the PMS in the master mode core closes the current primitive core group; and for another example, a change in the CG_PRIMITIVE_LIMIT value causes the current primitive core group to be closed and a new primitive core group to be started, this new primitive core group having an updated CG_PRIMITIVE_LIMIT value.

In an embodiment of the present disclosure, the software driver may set CG_PRIMITIVE_LIMIT to a default value. It will be understood that in order to optimally enhance the performance of the multi-core computer graphics processing system for tile-based rendering mode, experiments may be conducted to determine the value of CG_PRIMITIVE_LIMIT.

In some embodiments, by combining the above scheme one and scheme two, the splitting of primitive core groups is controlled.

Specifically, the conditions for closing the current primitive core group are set as follows:
condition one: the number of primitives reaches the core group primitive limit CG_PRIMITIVE_LIMIT;
condition two: the value of the core group primitive limit CG PRIMITIVE_LIMIT is changed;

condition three: the number of geometry tasks reaches the core group geometry task limit CG_GEOMETRY_TASK_LIMIT; and condition four: the value of the core group geometry task limit CG_GEOMETRY_TASK_LIMIT is changed.

In response to any one of the above conditions one to four being satisfied, the current primitive core group is closed and a new primitive core group is started.

In this combined scheme, both primitive limit and geometry task limit are considered for primitive core group split for primitive stream distribution among the cores of the multi-core computer graphics processing system for tile-based rendering mode. This combined method is more complex but also more flexible.

The value of CG_PRIMITIVE_LIMIT can be set more flexibly through the software driver. The software driver can set the value of CG_PRIMITIVE_LIMIT of each primitive drawing command by analyzing the character of primitives in the primitive drawing command. There is no need to start a new primitive core group just due to rendering state change, and thus CG_PRIMITIVE_LIMIT can be set across multiple primitive drawing commands. In response to the total number of primitives for multiple primitive drawing commands reaching the limit value of CG_PRIMITIVE_LIMIT or in response to the value of CG_PRIMITIVE_LIMIT being changed, a new primitive core group may be started.

CG_GEOMETRY_TASK_LIMIT may be set as a configuration parameter that is used to control the number of geometry tasks processed in each core. CG_GEOMETRY_TASK_LIMIT should be more accurate to reflect the workload of the hardware geometry processing pipelines. It may be used as a compensation for the primitive limit, and additional control can be performed when it is not possible to distribute the geometry workload evenly by the primitive limit alone.

In some embodiments, the default values of CG_PRIMITIVE_LIMIT and CG_GEOMETRY_TASK_LIMIT may be selected through experiments to achieve better performance of the multi-core computer graphics processing system for tile-based rendering mode.

The primitive core groups generated in the PSM of the master mode core are sent to geometry processing pipelines in all cores of the multi-core computer graphics processing system for tile-based rendering mode so as to distribute geometry workload. In the embodiments of the present disclosure, different distribution schemes may be adopted to carry out the distribution of geometry workload.

In some embodiments, the generated primitive core groups are sent to the geometry processing pipelines of the cores in a round-robin manner. That is, in the multi-core computer graphics processing system for tile-based rendering mode, the primitive core groups are sent to each of the cores in order regardless of the current state of the core. This scheme is easy to be implemented in the multi-core computer graphics processing system for tile-based rendering mode. But when the workload of the cores is unbalanced, pipeline stall may occur since the core that will accept the next primitive core group is still busy with the existing geometry processing work.

In some embodiments, the generated primitive core groups are sent to the geometry processing pipelines of the cores in a weighted distribution manner. That is, for the multi-core computer graphics processing system for tile-based rendering mode, primitives in primitive core groups are processed in the geometry processing pipelines of each of the cores, and the geometry workload across individual cores may be unbalanced. Geometry processing includes various operations, such as shader execution, vertex projection, and primitive clipping and culling.

In the embodiments of the present disclosure, a weighted distribution scheme is proposed in order to consider the workload of the cores during the distribution of primitive core groups.

$W_j$ is a combined weight factor of a j-th core that considers the input and output capabilities of geometry processing pipelines in combination, which may be used for the distribution of geometry workload among the master mode core and the slave mode cores. $j=1, 2, \ldots, n$, and the weight factors of n cores are denoted as $W_1$, $W_2$, $W_3$, ..., and $W_n$, respectively, and the value of the weight factor $W_j$ should be calculated according to the current workload state of each core.

In the weighted distribution scheme, the PSM in the master mode core may send a query as to the combined weight factors to all cores, and then decide which core the new primitive core group is to be sent to. The combined weight factor of each core will be sent back to the PSM in the master mode core via the inter-core connection. In the multi-core computer graphics processing system for tile-based rendering mode, the PSM in the master mode core sends the new primitive core group to the core with the greatest weight factor.

In other embodiments of the present disclosure, each core is caused to broadcast the combined weight factor to the PSM in the master mode core. The PSM in the master mode core will send the new primitive core group to the core with the greatest combined weight factor.

In some embodiments, the combined weight factor of a j-th core is $W_j = k_{jin} * W_{jin} + k_{jout} * W_{jout}$. Here, $W_{jin}$ denotes a weight factor of the j-th core from vertex input capability of the geometry processing pipelines, and $W_{jout}$ denotes a weight factor of the j-th core from vertex output capability of the geometry processing pipelines; and the core with greater values of $W_{jin}$ and $W_{jout}$ will have higher priority to receive the next primitive core group from the PSM. $k_{jin}$ and $k_{jout}$ denote predefined coefficients for $W_{jin}$ and $W_{jout}$, respectively, which may be determined through experiments in order to obtain a more balanced distribution of geometry workload in the multi-core computer graphics processing system for tile-based rendering mode.

In some embodiments, the j-th core is arranged to have m (m≥1) geometry processing pipelines.

The weight factor $W_{jin}$ of the j-th core from vertex input capability of the geometry processing pipelines may be denoted as:

$$W_{jin} = \sum_{i=1}^{i=m} S_{ini}$$

where $S_{ini}$ denotes the capability for an i-th geometry processing pipeline to accept new input geometry data, e.g., vertex data and primitive data.

In some embodiments, $S_{ini} = \text{Vert}_{freei} / \text{Vert}_{fulli}$. Here, $\text{Vert}_{freei}$ denotes the available space for vertices in the geometry input data buffer of the i-th geometry processing pipeline, and $\text{Vert}_{fulli}$ denotes the size of the geometry input data buffer of the i-th geometry processing pipeline.

The weight factor $W_{jout}$ of the j-th core from vertex output capability of the geometry processing pipelines may be denoted as:

$$W_{jout} = \sum_{i=1}^{i=m} S_{outi}$$

where $S_{outi}$ denotes the capability for the i-th geometry processing pipeline to accept output geometry data (e.g., vertex data and primitive data) during geometry transformation and other pipeline stages.

In some embodiments, $S_{outi} = \text{Vert}_{spacei}/\text{Vert}_{buffersizei}$. Here, $\text{Vert}_{spacei}$ denotes the available space for vertices in the geometry transformation module output data buffer of the i-th geometry processing pipeline, and $\text{Vert}_{buffersizei}$ denotes the size of the geometry transformation module output data buffer of the i-th geometry processing pipeline.

A PSM is added into the input assembler module, and the PSM fully considers various factors (e.g., dynamically distributed input primitive data) within a graphics processing unit (GPU) during task distribution and can thus distribute tasks in a more rational and efficient manner (e.g., providing different allocation manners), and the actual workload of hardware can be reflected more accurately, which helps achieve the optimal performance.

In some embodiments, in the multi-core computer graphics processing system for tile-based rendering mode, there is only one core working in the master mode, that is, there is only one master mode core. In some embodiments, in the multi-core computer graphics processing system for tile-based rendering mode, there is one or more cores working in the slave mode, that is, there may be one or more slave mode cores. In some embodiments, the master mode core is connected to one slave mode core, or the master mode core is connected to multiple slave mode cores.

In some embodiments, the geometry processing system of the master mode core includes one geometry processing pipeline, and the data distribution module of the master mode core is configured to send the distributed primitive core groups down to the downstream geometry processing pipeline. In some embodiments, the geometry processing system of the master mode core includes multiple geometry processing pipelines, and the data distribution module of the master mode core is configured to allocate the distributed primitive core groups to the multiple geometry processing pipelines downstream, that is, the data distribution module of the master mode core distributes the geometry processing workload to the multiple geometry processing pipelines. In some embodiments, the geometry processing system of a slave mode core includes one geometry processing pipeline, and the data distribution module of the slave mode core is configured to send the distributed primitive core groups down to the downstream geometry processing pipeline. In some embodiments, the geometry processing system of a slave mode core includes multiple geometry processing pipelines, and the data distribution module of the slave mode core is configured to allocate the distributed primitive core groups to the multiple geometry processing pipelines downstream, that is, the data distribution module of the slave mode core distributes the geometry processing workload to the multiple geometry processing pipelines.

As shown in FIG. 2, the geometry processing system further includes a tiling module. Taking the master mode core as an example, the downstream geometry processing pipelines processes the distributed primitive core groups, such that the primitive core groups only contain primitives in the screen view space that need to be rendered; and in the tiling module, primitive core groups from all the geometry processing pipelines are merged in the original distribution order, and the merged primitive core group is tiled into multiple tiles in the screen view space, and a tiling display list is generated for each tile. The processing method for the slave mode core is similar to that for the master mode core and will not be repeated here.

In some embodiments, the multi-core computer graphics processing system for tile-based rendering mode further includes a core operating in a standalone mode, which is referred to as a standalone mode core. The standalone mode core is not connected to any slave mode core, and the scheduler of the standalone mode core only controls its own processing events. In this case, the inter-core connection does not need to allocate primitive streams among multiple cores. Specifically, the data processing module of the input assembler module of the standalone mode core receives the input data stream and constructs primitives according to the input data stream; and the PSM of the input assembler module of the standalone mode core works in a bypass mode, that is, in the PSM, the constructed primitives are not split into separate primitive core groups, but are directly sent to the data distribution module, and then the primitive stream is sent by the data distribution module to the downstream geometry processing pipelines. Similarly, when there is one geometry processing pipeline, the data distribution module directly sends the primitive stream to the downstream geometry processing pipeline; and when there are multiple geometry processing pipelines, the data distribution module allocates the primitive stream to the multiple geometry processing pipelines downstream.

Since other functions of the input assembler module remain unchanged, it is very convenient to configure the core in the master mode, the slave mode, or the standalone mode. Taking the multi-core computer graphics processing system for tile-based rendering mode illustrated in FIG. 1 as an example, the working modes of the 4 cores may be configured according to the actual needs, for example, 1 master mode core, 2 slave mode cores, and 1 standalone mode core; or 1 master mode core, 1 slave mode core, and 2 standalone mode cores.

In the architecture of the multi-core computer graphics processing system for tile-based rendering mode of the embodiments of the present disclosure, by introducing the PSM into the input assembler module of the geometry processing system of the core, the graphics processing tasks can be distributed to multiple cores in the geometry processing phase for parallel and cooperative processing, thus avoiding the performance bottleneck caused by the heavy work in the geometry processing phase.

In some embodiments, the PSM in the input assembler module of the master mode core splits the primitive stream into separate primitive core groups having rendering state data, and then adds a core group index (CGI) at the start of each primitive core group. In some embodiments, the core group index is an incremental integer count. The CGI is passed down through a geometry processing pipeline and written to a tiling display list as a special display list entry.

In some embodiments, the PSM of the master mode core will reset the CGI value to 0 at the start of each geometry processing phase. In some embodiments, the CGI value may be wrapped around to 0 after reaching the maximum value.

In some embodiments, the rendering state data is processed by the input assembler module of the master mode core and included in the primitive core groups. Only the rendering state data used by the primitive core groups is sent to the cores together with the primitive core groups. When primitives called by the drawing command are split into different primitive core groups, the same rendering state data may be duplicated in multiple primitive core groups.

In other embodiments of the present disclosure, the rendering state data may be sent to each primitive core group.

In some embodiments the tiling module of the master mode core merges, according to the core group indexes, primitive core groups from all the geometry processing pipelines of this master mode core in the original distribution order, and tiles the merged primitive core group into multiple tiles in screen view space, and generates a tiling display list for each tile. Similarly, the tiling module of a slave mode core merges, according to the core group indexes, primitive core groups from all the geometry processing pipelines of this slave mode core in the original distribution order, and tiles the merged primitive core group into multiple tiles in the screen view space, and generates a tiling display list for each tile. The core group indexes are included as special entries in the tiling display lists for the master mode core and the slave mode cores.

Figure 3:
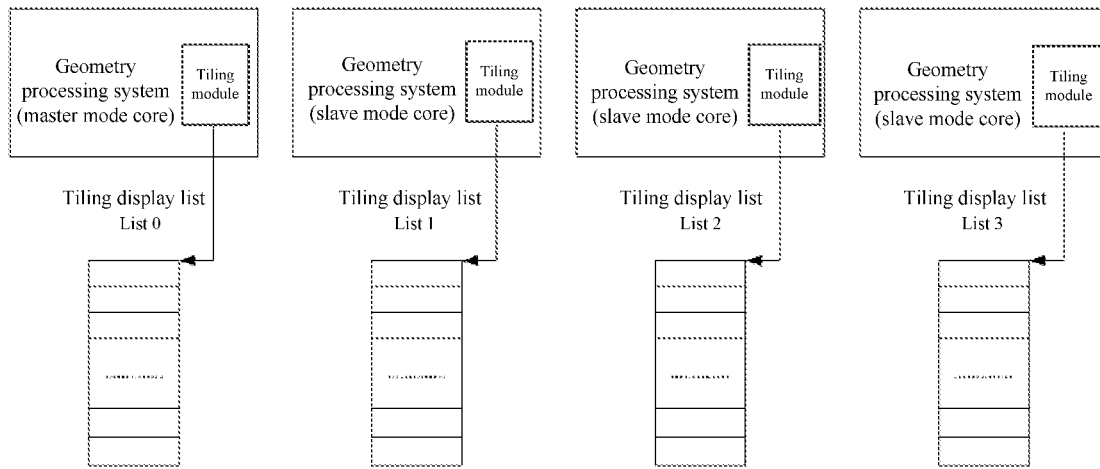
FIG. 3 is a schematic diagram of the generation of tiling display lists by geometry processing systems of a master mode core and slave mode cores according to an embodiment of the present disclosure.

As shown in FIG. 3, in each of the cores of the multi-core computer graphics processing system for tile-based rendering mode according to the embodiments of the present disclosure, the tiling display lists are written in a separate memory space, regardless of whether the core is in the master mode or the slave mode. Specifically, for some tile, the tiling module of the master mode core generates a tiling display list List0, and the tiling modules of the 3 slave mode cores generate tiling display lists List1, List2, and List3, respectively. In other words, for some tile, the geometry processing systems of the four cores perform parallel and cooperative processing on the input geometry data and each generate a tiling display list, resulting in a total of four tiling display lists.

The tiling display lists generated by the geometry processing systems will be sent to the fragment processing systems for subsequent processing. In each of the cores of the multi-core computer graphics processing system for tile-based rendering mode according to the embodiments of the present disclosure, the fragment processing system will process the tiling display lists from the master mode core and the slave mode cores. Each of the cores has separate display lists with a separate memory space, so that the waiting time across the cores for merging the display lists can be shortened, and data blocking caused by waiting can be prevented.

Figure 4:
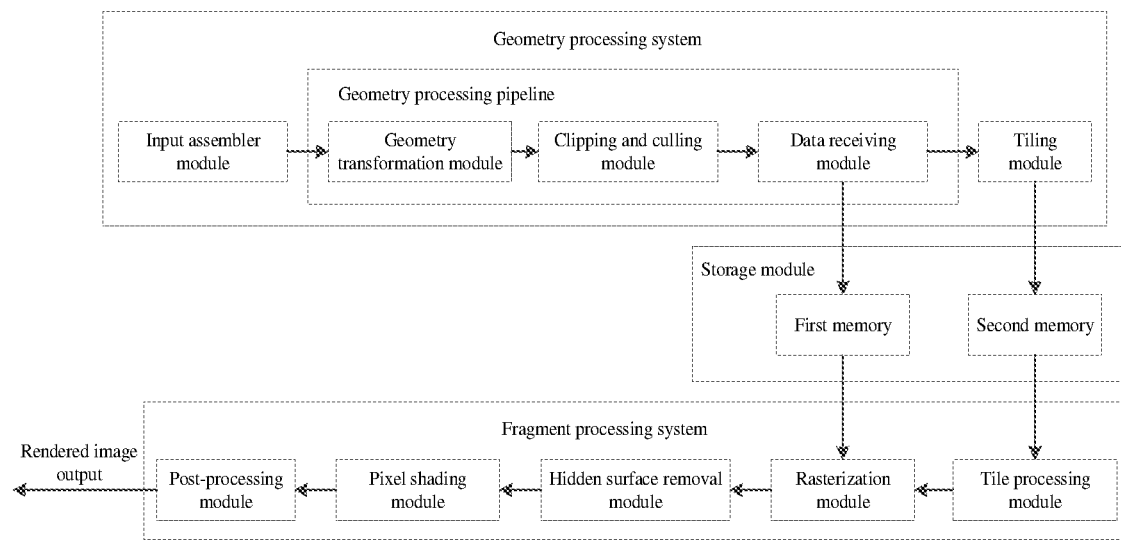
FIG. 4 is a schematic diagram of a master mode core or a slave mode core according to an embodiment of the present disclosure.

As shown in FIG. 4, in the master mode core and slave mode cores of the multi-core computer graphics processing system for tile-based rendering mode according to the embodiments of the present disclosure, the geometry processing pipeline further includes a geometry transformation module, a clipping and culling module, and a data receiving module. Here, the geometry transformation module is configured to process primitive core groups distributed by the input assembler module to transform vertex data of the primitives into the screen view space. The clipping and culling module is configured to remove primitives invisible in the screen view space to update the primitive core groups. For example, the clipping and culling module removes primitives outside the screen view space and back-facing primitives in the screen view space, such that all the primitives that remain after processing of the clipping and culling module are in the screen view space and are those needing to be rendered in the computer graphics processing system. The data receiving module is configured to receive and store the updated primitive core groups and the transformed vertex data. In some embodiments the data receiving module is further configured to compress the stored primitive data and transformed vertex data, and then store the compressed data to a first memory of the storage module. In some embodiments in one or more geometry processing pipelines of the master mode core, the primitive data and vertex data stored by the data receiving module are both stored in the first memory, and in one or more geometry processing pipelines of a slave mode core, the primitive data and vertex data stored by the data receiving module are also both stored in the first memory.

In each of the master mode core and the slave mode cores, the tiling module merges primitive core groups (i.e. updated primitive core groups stored by the data receiving module) from all geometry processing pipelines of the core where it is located in the original distribution order, tiles the merged primitive core group into multiple tiles in the screen view space, and generates a tiling display list (e.g., tiling display list List0, List1, List2, or List3 in FIG. 3) for each tile, and stores the generated tiling display lists into a second memory of the storage module. That is, the tiling display lists generated by the master mode core and the tiling display lists generated by each slave mode core are both stored to the second memory of the storage module.

The core group index (CGI) is an incremental integer value generated in the PSM by the master mode core, which is used to split the primitive stream into primitive core groups. The CGI value is passed from the PSM to a geometry processing pipeline and then to the tiling module, and is added to a tiling display list as a special display list entry.

In an embodiment of the present disclosure, the software driver will reserve a separate tiling display list memory space for each core of the multi-core computer graphics processing system for tile-based rendering mode. Therefore, in a system with n cores, there may be n tiling display list base addresses for each tile.

In some embodiments if no primitives in the primitive core groups processed by a core overlap a tile, tiling display list in the core may be empty for the tile, although it may not be empty for the tile in other cores. At the end of the geometry processing of the rendering, a display list terminator entry must be written to each tiling display list for each tile.

In an embodiment of the present disclosure, the tiling display list entry type could be described by a 2-bit CS type, such as primitives, display list link, and display list terminator, and a new type for CGI, as shown in Table 1 below.

TABLE 1

| CS Entry Type | Encoding |
| --- | --- |
| Primitives | 00b |
| CGI | 01b |
| Display List Link | 10b |
| Display List Terminator | 11b |

A new tiling display list entry is added for CGI, as shown in Table 2 below.

TABLE 2

| Bit | Symbol | Description |
| --- | --- | --- |
| 31:30 | CS_TYPE | 01b CGI |
| 29:0 | CS_CGI | Core Group Index value (an integer consisting of 30 bits) |

The tiling module adds a CGI entry to the start of a tiling display list, holding the CGI value to mark the start of a primitive core group. There is no change in other tiling display list entries after the CGI entry in the tiling display list for the primitive core group.

In the computer graphics processing system for tile-based rendering mode, the fragment processing of the rendering starts after the completion of the geometry processing phase. In the fragment processing phase, the vertex data transformed and prepared in the geometry processing phase and its corresponding rendering state data will be used in the rendering pipeline. The rendering of the scene is done in each tile on the screen separately.

As shown in FIG. 4, in the master mode core and the slave mode cores of the multi-core computer graphics processing system for tile-based rendering mode according to the embodiments of the present disclosure, the fragment processing system further includes a tile processing module, a rasterization module, a hidden surface removal module, a pixel shading module, and a post-processing module. In each of the master mode core and the slave mode cores, the tile processing module is configured to read tiling display lists generated by the geometry processing systems from the second memory, where multiple tiling display lists are read, which include tiling display lists generated by the geometry processing system of the core where this tile processing module is located and tiling display lists generated by geometry processing systems of the other cores.

The tile processing module reads, from the separate tiling display lists, primitive information needed to render each tile. In an embodiment of the present disclosure, when the tile processing module starts processing a tile, there will be multiple tiling display list base addresses written from the geometry processing pipelines of the master mode core and the slave mode cores, and the multiple tiling display lists may be opened by the tile processing module from different tiling display list base addresses. Primitives in a tile may not need to be processed by geometry processing pipelines of each core. Therefore, tiling display list may be empty for some tile in some core. In an embodiment of the present disclosure, the tile processing module processes non-empty tiling display lists in the tile.

The tile processing module merges the read tiling display lists into one single tiling display list in an original distribution order for each tile according to core group index entries in the read tiling display lists. Since the tiling display lists from multiple cores are merged into one single tiling display list, subsequent processing by the fragment processing systems is not affected by multiple tiling display lists generated by the master mode core and the slave mode cores.

Figure 5:
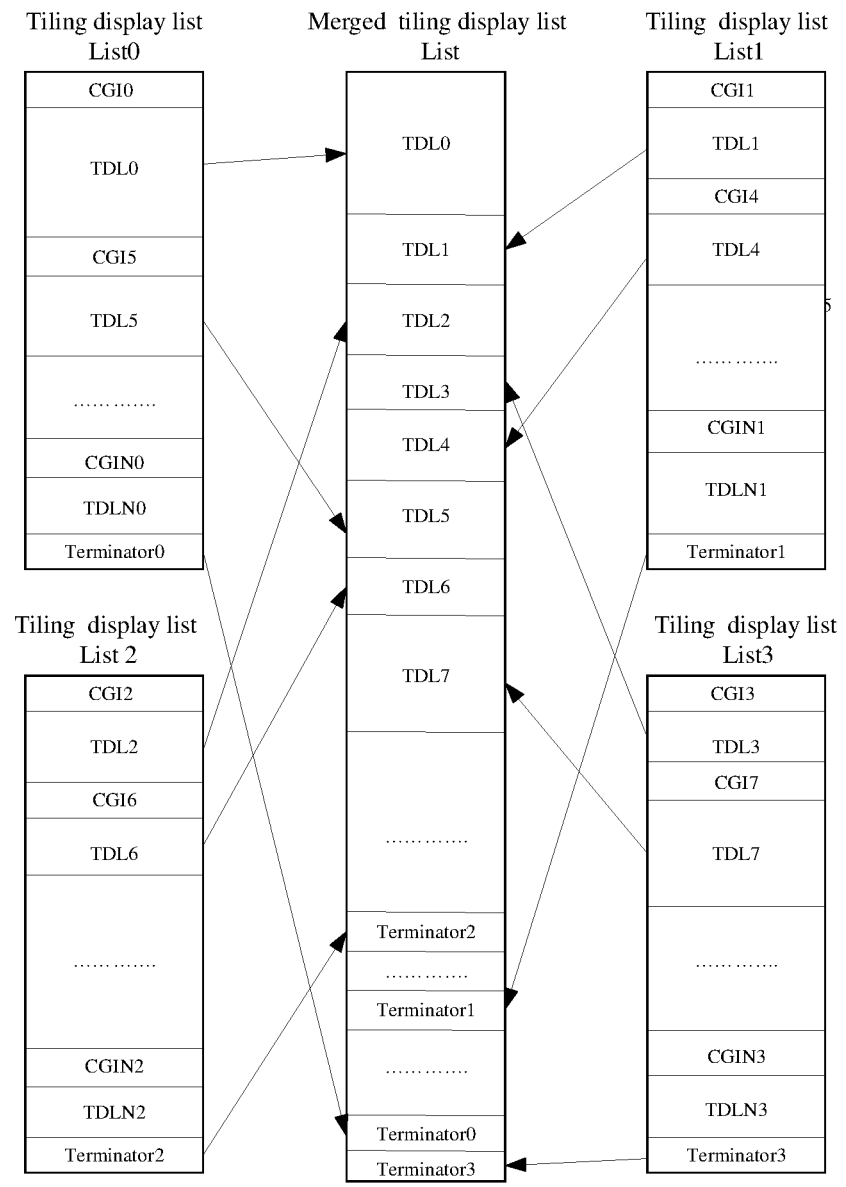
FIG. 5 is a schematic diagram of the merging of multiple tiling display lists into one single list by a tile processing module according to an embodiment of the present disclosure.

FIG. 5 is a schematic diagram of the merging of tiling display lists from multiple cores into one single list by a tile processing module according to an embodiment of the present disclosure. The core group index appears as a special tiling display list entry at the start position of each tiling display list, followed by other tiling display list entries, such as storage addresses of primitives in the primitive core group, display list link pointer, and display list terminator, among others.

The tile processing module keeps tracking CGIs in all the tiling display lists, where a tiling display list with the lowest CGI value is first taken as a current tiling display list, and the current tiling display list is processed until a next tiling display list entry of the current tiling display list is either a new CGI entry or a terminator entry in the tiling display list; in response to a new CGI entry appearing in the current tiling display list, the tile processing module again compares the CGI values in all the tiling display lists, such that a tiling display list currently with the lowest CGI value is taken as a current tiling display list, and the current tiling display list is processed until a next tiling display list entry of the current tiling display list is either a new CGI entry or a terminator entry in the tiling display list; and in response to a terminator entry appearing in the current tiling display list, the tile processing module again compares the CGI values in all the other tiling display lists, such that a tiling display list currently with the lowest CGI value is taken as a current tiling display list, and the current tiling display list is processed until a next tiling display list entry of the current tiling display list is either a new CGI entry or a terminator entry in the tiling display list.

As shown in FIG. 5, the geometry processing systems of the 4 cores of the multi-core computer graphics processing system for tile-based rendering mode each generate one tiling display list, resulting in a total of 4 tiling display lists, each of which is located in a separate memory space. The core group indexes CGI0, CGI1, CGI2, and CGI3 appear as special tiling display list entries at the start position of each tiling display list, N+1 tiling display list entries TDL0, TDL1, TDL2, . . . , and TDLN are headed by N+1 core group indexes CGI0, CGI1, CGI2, . . . , and CGIN as special entries, respectively, and tiling display list entries TDL0, TDL1, TDL2, . . . , and TDLN contain relevant information for primitives in the primitive core groups, respectively.

Each tile in rendering may have multiple tiling display lists. The tiling display lists are processed in the tile processing module according to the order of the CGI values at the start of the primitive core groups in the tiling display lists. When processing tiling display lists for a tile, the current CGI values (which are all integers) from each tiling display list are first stored in the tile processing module, as shown in Table 3 below, which is an example of a 4-core computer graphics processing system for tile-based rendering mode. The 4 CGI values are compared in the tile processing module, and then a tiling display list with the lowest CGI value is processed (for example, when the value of CGI0 is the smallest, the tiling display list List0 is processed) with the CGI entry (for example, CGI0) removed until the next display list entry is either a CGI entry or a display list terminator entry in the tiling display list.

TABLE 3

| Core0 | Core1 | Core2 | Core3 |
|---|---|---|---|
| CGI0 | CGI1 | CGI2 | CGI3 |

Specifically, in response to a new CGI entry (e.g., CGI5) appearing in the current tiling display list (e.g., List0), the CGI value stored by the tile processing module will be updated, and then a tiling display list with the lowest CGI value will be processed; and in response to a terminator entry Terminator0, Terminator1, Terminator2, or Terminator3 (e.g., Terminator0) appearing in the current tiling display list, the tile processing modules again compare CGI values in the remaining other tiling display lists (e.g., List1, List2, and List3), then process a tiling display list with the lowest CGI value, and after the processing is finished, remove the CGI entry in this tiling display list.

When the tiling display list terminator entry is processed, this tiling display list is terminated; and when all tiling display lists for the tile are terminated, the merging of the tiling display lists for the tile is finished. With the above processing, tiling display lists from multiple cores are re-merged into one single tiling display list in the tile processing modules of the master mode core and the slave mode cores according to the CGI entries in the order of original submission. That is to say, a tiling display list is generated in each of the tile processing modules of the master mode core and the slave mode cores. Therefore, fragment processing in subsequent pipelines is not affected by multiple tiling display lists generated by the master mode core and the slave mode cores.

In each of the master mode core and the slave mode cores, the rasterization module is configured to read primitive data and transformed vertex data of primitives referenced in the merged tiling display list from the first memory, and rasterize the primitives into visible pixels.

In each of the master mode core and the slave mode cores, the hidden surface removal module is configured to compare depth values of primitive pixels output by the rasterization module with depth values of previous primitive pixels stored in a depth buffer, and remove a primitive pixel output by the rasterization module when the primitive pixel output by the rasterization module is hidden behind a corresponding previous primitive pixel, that is, the primitive pixel fails the depth test, or otherwise, send the primitive pixel output by the rasterization module to the pixel shading module. In some embodiments the depth values of the previous primitive pixels are predefined values. In some embodiments the depth values of the previous primitive pixels are the depth values of the primitive pixels that passed the depth test before.

In each of the master mode core and the slave mode cores, the pixel shading module is configured to shade primitive pixels output by the hidden surface removal module to obtain the final color of the primitive pixels. The post-processing module is configured to accumulate colors generated from the primitive pixels. In some embodiments, the post-processing module is further configured to perform some post-processing operations, e.g., format conversion, down sampling, etc., on the accumulated primitive pixel colors.

After the fragment processing system of each of the master mode core and the slave mode cores finishes processing all the primitives in the merged tiling display list, a final rendered image for the tile is generated. The final rendered image may be sent to an external display unit of the computer graphics processing system for display.

In some embodiments, the rasterization module acquires the original vertex data (i.e., the input vertex data) of the primitives in the primitive core group and transforms the original vertex data of the primitives into the screen space before rasterizing the primitives into pixels.

In some embodiments, after the fragment processing in all the tiles is finished, the multi-core computer graphics processing system for tile-based rendering mode releases the first memory distributed to the primitive data and the vertex data and the second memory distributed to the tiling display lists.

In the multi-core computer graphics processing system for tile-based rendering mode according to the embodiments of the present disclosure, the PSM of the master mode core may split the primitive stream into primitive core groups according to different situations in order to carry out distributed geometry processing work among geometry processing pipelines of all the cores, so that the data processing capability of the system can be significantly improved and thus massive geometry data can be processed, thereby avoiding the performance bottleneck in the processing of massive geometry data.

Figure 6:
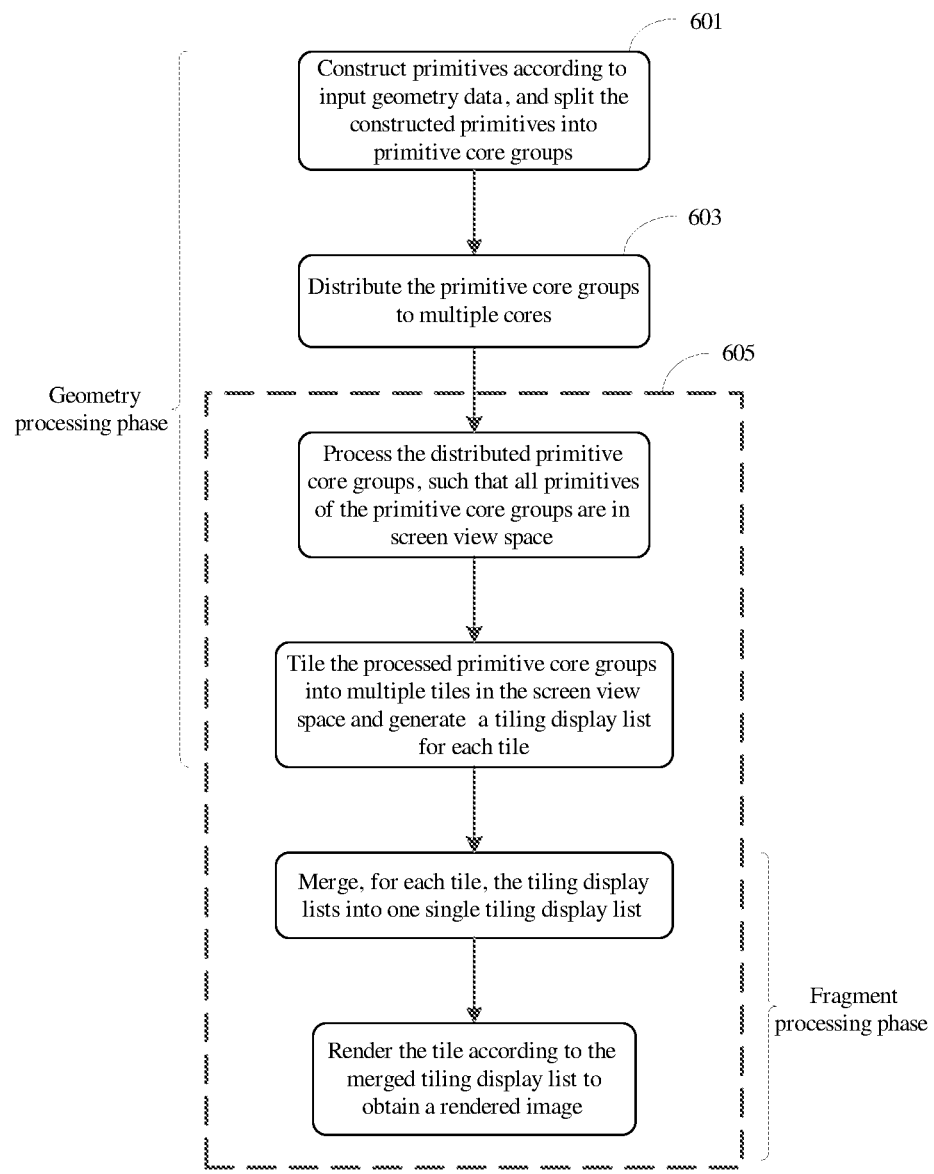
FIG. 6 is a flowchart of a graphics processing method according to an embodiment of the present disclosure.

As shown in FIG. 6, corresponding to the graphics processing system described above, a further embodiment of the present disclosure provides a graphics processing method including the following steps.

At step 601, primitives are constructed according to input geometry data, and the constructed primitives are split into primitive core groups.

In some embodiments, constructing primitives according to input geometry data includes: closing a current primitive core group and starting a new primitive core group in response to a predefined condition being satisfied.

In some embodiments, the predefined condition is that the number of primitives in the current primitive core group reaches a predefined core group primitive limit, or the value of the core group primitive limit is changed, or the number of geometry tasks in the current primitive core group reaches a predefined core group geometry task limit, or the value of the core group geometry task limit is changed.

In some embodiments, splitting the constructed primitives into primitive core groups includes: adding a core group index to each of the primitive core groups, where the core group indexes are used to split a stream of the constructed primitives into the primitive core groups. In some embodiments, the core group indexes are incremental integers among the primitive core groups.

At step 603, the primitive core groups are distributed to multiple cores.

In some embodiments, the primitive core groups are distributed to each of the multiple cores in order.

In some embodiments, each of the primitive core groups is distributed to the core with the greatest combined weight factor among the multiple cores, where each of the cores includes geometry processing pipelines, the geometry processing pipelines being configured to process the distributed primitive core groups, such that all primitives of the primitive core groups are in screen view space. The combined weight factor considers the input and output capabilities of the geometry processing pipelines of the core in combination.

In some embodiments, the combined weight factor of a j-th core is $W_j = k_{jin} * W_{jin} + k_{jout} * W_{jout}$, where $W_{jin}$ denotes a weight factor of the j-th core from vertex input capability of the at least one geometry processing pipeline, $W_{jout}$ denotes a weight factor of the j-th core from vertex output capability of the at least one geometry processing pipeline, and $k_{jin}$ and $k_{jout}$ denote predefined coefficients for $W_{jin}$ and $W_{jout}$, respectively.

In some embodiments, $W_{jin} = \Sigma_{i=1}^{i=m} S_{ini}$, and $W_{jout} = \Sigma_{i=1}^{i=m} S_{outi}$, where $S_{ini}$ denotes the capability for an i-th geometry processing pipeline to accept new input geometry data, $S_{outi}$ denotes the capability for the i-th geometry processing pipeline to accept output geometry data during geometry transformation and other pipeline stages, and m denotes the number of geometry processing pipelines that the j-th core includes.

At step 605, the distributed primitive core groups are processed separately in the multiple cores to obtain a rendered image.

In some embodiments, the distributed primitive core groups are processed, such that all primitives of the primitive core groups are in screen view space; and the processed primitive core groups are tiled into multiple tiles in the screen view space.

In some embodiments, the distributed primitive core groups are tiled into multiple tiles in the screen view space; and a tiling display list is generated for each tile in each of the multiple cores.

In some embodiments, the tiling display list contains core group indexes.

In some embodiments, steps 601 and 603 and the above procedures of step 605 belong to the geometry processing phase and the following procedures of step 605 belong to the fragment processing phase.

In some embodiments, the tiles are rendered according to the generated tiling display lists to obtain the rendered image.

In some embodiments, for each tile, core group indexes in the tiling display lists from the multiple cores are acquired, and the tiling display lists are merged into one single tiling display list in an original distribution order; and the tile is rendered according to the merged tiling display list to obtain the rendered image.

In some embodiments, merging the tiling display lists into one single tiling display list specifically includes: keep tracking core group indexes in all the tiling display lists; taking a tiling display list with the lowest core group index value as a current tiling display list; processing the current tiling display list until a next tiling display list entry of the current tiling display list is either a new core group index entry or a terminator entry; in response to a new core group index entry appearing in the current tiling display list, comparing the values of the core group indexes in all the tiling display lists again, taking a tiling display list currently with the lowest core group index value as a current tiling display list, and processing the current tiling display list until a next tiling display list entry of the current tiling display list is either a new core group index entry or a terminator entry; and in response to a terminator entry appearing in the current tiling display list, comparing the values of core group indexes in the remaining other tiling display lists again, taking a tiling display list currently with the lowest core group index value as a current tiling display list, and processing the current tiling display list until a next tiling display list entry of the current tiling display list is either a new core group index entry or a terminator entry.

In some embodiments, primitives referenced in each merged tiling display list are rasterized into visible pixels; depth values of the primitive pixels are compared with depth values of previous primitive pixels, and the primitive pixels hidden by the previous primitive pixels are removed for failing the depth test; and the remaining primitive pixels are shaded, and post-processing operations, including but not limited to accumulation, are performed on the generated colors. After the processing of all the primitives in the merged tiling display list is finished, a final rendered image for the tile is generated.

For further implementations of the graphics processing method according to the embodiments of the present disclosure, reference may be made to the description of the graphics processing system in the foregoing embodiments, as the method and system have the same or similar beneficial effects, which will not be repeated herein.

Figure 7:
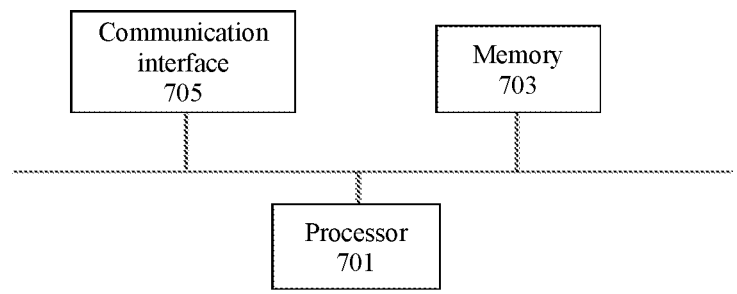
FIG. 7 is a block diagram of an electronic device according to an embodiment of the present disclosure.

FIG. 7 is a block diagram of an electronic device according to an embodiment of the present disclosure. A further embodiment of the present disclosure provides an electronic device, as shown in FIG. 7, including: at least one processor 701 and a memory 703 communicatively connected to the at least one processor 701. The memory 703 stores instructions executable by the at least one processor 701. The instructions are executed by the at least one processor 701. The processor 701, when executing the instructions, implements the graphics processing method in the above embodiments. The number of the memory/memories 703 and processor(s) 701 may be one or more. The electronic device is intended to represent various types of digital computers, such as a laptop computer, a desktop computer, a workstation, a personal digital assistant, a server, a blade server, a mainframe computer, and other suitable computers. The electronic device may also represent various types of mobile devices, such as a personal digital assistant, a cellular phone, a smart phone, a wearable device, and other similar computing devices. The components shown herein, their connections and relationships, and their functions are intended as examples only and are not intended to limit the implementation of the present disclosure described and/or claimed herein.

The electronic device may also include a communication interface 705 for communicating with external devices for interactive data transmission. The various devices are connected to each other using different buses and may be mounted on a common motherboard or otherwise mounted as required. The processor 701 may process instructions executed within the electronic device, including instructions stored in or on the memory to display graphical information for a graphical user interface (GUI) on an external input/output device, such as a display device coupled to an interface. In other embodiments, if desired, multiple processors and/or multiple buses may be used with multiple memories. Likewise, multiple electronic devices may be connected, each providing part of the necessary operations (e.g., as a server array, a blade server, or a multiprocessor system). The buses may involve an address bus, a data bus, a control bus, etc. For ease of presentation, only one thick line is used for representation in FIG. 7. However, it is not implied that there is only one bus or one type of bus.

Alternatively, in specific embodiments, if the memory 703, the processor 701, and the communication interface 705 are integrated on one single chip, the memory 703, the processor 701, and the communication interface 705 may communicate with each other through internal interfaces.

It should be understood that the processor may be a central processing unit (CPU), or other general purpose processors, a digital signal processor (DSP), an application-specific integrated circuit (ASIC), a field-programmable gate array (FPGA), or other programmable logic devices, discrete gates or transistor logic devices, discrete hardware components, etc. The general-purpose processor may be a microprocessor or any conventional processor. It is worth noting that the processor may be a processor that supports the Advanced RISC Machines (ARM) architecture.

An embodiments of the present disclosure provides a computer-readable storage medium (such as the memory 703 described above) storing computer instructions which, when executed by a processor, causes the processor to implement the method according to any of the embodiments of the present disclosure.

Alternatively, the memory 703 may include a storage program area and a storage data area, where the storage program area may store an operating system and application program(s) required by at least one function, and the storage data area may store data created according to the use of the electronic device for the graphics processing method, etc. In addition, the memory 703 may include a high-speed random access memory and a non-transitory memory, for example, at least one magnetic disk storage device, a flash memory device, or another non-transitory solid-state storage device. In some embodiments, the memory 703 optionally includes memories remotely located with respect to the processor 701, and these remote memories may be connected to the electronic device for the graphics processing method via a network. Examples of the above-mentioned network include the Internet, an intranet, a local area network, a mobile communication network, and a combination thereof.

In description of the present disclosure, references to "one embodiment," "some embodiments," "an example," "a specific example," "some examples," etc., indicate that a particular feature, structure, material, or characteristic described in the embodiment or example can be included in at least one embodiment or example of the disclosure. Moreover, the particular feature, structure, material, or characteristic described can be combined in any one or more embodiments or examples in a reasonable way. Besides, it would be within the knowledge of a person skilled in the pertinent art to affect such feature, structure, material, or characteristic in connection with other embodiments or examples without contradiction.

Moreover, terms such as "first" and "second" are just for illustration which should not be interpreted as indicating or implying relative importance, or implying number of the indicated feature. Thus, a feature described by "first" or "second" can include at least one of the feature explicitly or implicitly. In description of the present disclosure, "multiple" means two or more, unless otherwise specified.

Any process or method described in a flowchart or otherwise herein can be interpreted as including one or more (two or more than two) modules, fragments or sections of executable code to implement steps of a specified logical function or process. Also, the scope of preferred embodiments of the disclosure includes alternative embodiments where the function can be performed out of the order shown or discussed, including performing the function in a substantially simultaneous way or in a reverse order.

The logic and/or steps described in a flowchart or otherwise herein, for example, can be a list of executable code to implement a logic function, which can be embodied in any computer-readable medium and can be used by or in combination with an instruction execution system, apparatus or device (e.g., a computer-based system, a system including a processor, or other systems capable of reading and executing instructions from an instruction execution system, apparatus or device).

It should be understood that various parts of the present disclosure can be implemented by hardware, software, firmware, or a combination thereof. In the foregoing embodiments, various steps or methods can be implemented by software or firmware stored in a memory and executed by a suitable instruction execution system. All or part of the steps of the methods in the foregoing embodiments can be implemented by controlling relevant hardware through a program, which can be stored in a computer-readable storage medium and can implement one or a combination of the steps of the method of the embodiment when executed.

In addition, all the function unit in each embodiment of the disclosure can either be integrated in one processing module, or be separate units, or two or more of the function units are integrated in one module. The integrated module can be implemented by hardware or by function modules of software. Being implemented in the form of software function modules and being sold or used as a separate product, the integrated module mentioned above can also be stored in a computer-readable storage medium, which could be a read-only memory, a magnetic disk, an optical disk, and the like.

Only some specific embodiments of the present disclosure are described above, and the scope of protection of the present disclosure is not limited thereto. Any changes or substitutions that can be readily conceived by those skilled in the art within the technical scope disclosed by the present disclosure shall fall within the scope of protection of the present disclosure. Therefore, the scope of protection of the present disclosure should be subject to the scope of protection of the claims.

The invention claimed is:

1. A graphics processing system comprising multiple cores with a master mode core and at least one slave mode core, wherein the master mode core is configured to construct primitives according to input geometry data, split the constructed primitives into primitive core groups, and distribute the primitive core groups to the master mode core and the at least one slave mode core; and the master mode core and the at least one slave mode core are configured to process the distributed primitive core groups to obtain a rendered image; wherein:
  each of the multiple cores comprises a geometry processing system and a fragment processing system; and the geometry processing system of each of the multiple cores comprises an input assembler module, at least one geometry processing pipeline, and a tiling module; wherein:
  the input assembler module of the master mode core is configured to construct the primitives according to the input geometry data, split the constructed primitives into the primitive core groups, and distribute the primitive core groups to the input assembler module of each of the multiple cores;
  the input assembler module of each of the multiple cores is configured to send the distributed primitive core groups to the corresponding at least one geometry processing pipeline;
  the at least one geometry processing pipeline of each of the multiple cores is configured to process the distributed primitive core groups to make sure all primitives of the primitive core groups are in screen view space;
  the tiling module of each of the multiple cores is configured to tile the primitive core groups from the corresponding at least one geometry processing pipeline into multiple tiles in the screen view space, and generate a tiling display list for each tile; and
  the fragment processing system of each of the multiple cores is configured to merge the tiling display lists generated by the geometry processing systems of the multiple cores into one single tiling display list, and render the tile according to the merged tiling display list to obtain the rendered image.

2. The graphics processing system of claim 1, wherein the number of the multiple cores is n, and there exists at least one tile having n tiling display lists being generated by the geometry processing systems of the n cores, respectively.

3. The graphics processing system of claim 1, wherein the number of the multiple cores is n, and there exists at least one tile having less than n tiling display lists being generated by the geometry processing systems of some of the n cores, respectively.

4. The graphics processing system of claim 1, wherein the input assembler module of each of the multiple cores comprises a data processing module, a primitive stream manager, and a data distribution module, wherein the primitive stream manager of each of the multiple cores comprises a frontend module and a backend module;

the data processing module of the master mode core is configured to construct primitives according to the input geometry data to form a primitive stream;

the frontend module of the master mode core is configured to split the primitive stream into primitive core groups and distribute the primitive core groups to the backend module of the master mode core and the backend module of the at least one slave mode core;

the data distribution module of the master mode core is configured to send the primitive core groups acquired by the backend module of the master mode core to the at least one geometry processing pipeline of the master mode core; the data distribution module of the at least one slave mode core is configured to send the primitive core groups acquired by the backend module of the at least one slave mode core to the at least one geometry processing pipeline of the at least one slave mode core; and the data processing module and the frontend module of the at least one slave mode core are in an inactive state.

5. The graphics processing system of claim 1, wherein during the splitting of the primitives into the primitive core groups, a current primitive core group is closed and a new primitive core group is started, in response to the number of primitives in the current primitive core group reaching a predefined core group primitive limit, or in response to a change of the value of the core group primitive limit, or in response to the number of geometry tasks in the current primitive core group reaching a predefined core group geometry task limit, or in response to a change of the value of the core group geometry task limit.

6. The graphics processing system of claim 1, wherein the primitive core groups are distributed to each of the multiple cores in order; or each of the primitive core groups is distributed to the core with the greatest combined weight factor among the multiple cores, wherein the combined weight factor is determined according to input and output capabilities of the at least one geometry processing pipeline of the core.

7. The graphics processing system of claim 6, wherein the combined weight factor of a j-th core is $W_j = k_{jin} * W_{jin} + k_{jout} * W_{jout}$, where $W_{jin}$ denotes a weight factor of the j-th core from vertex input capability of the at least one geometry processing pipeline, $W_{jout}$ denotes a weight factor of the j-th core from vertex output capability of the at least one geometry processing pipeline, and $k_{jin}$ and $k_{jout}$ denote predefined coefficients for $W_{jin}$ and $W_{jout}$, respectively.

8. The graphics processing system of claim 7, wherein $W_{jin} = \Sigma_{i=1}^{i=m} S_{ini}$, and $W_{jout} = \Sigma_{i=1}^{i=m} S_{outi}$, wherein $S_{ini}$ denotes the capability for an i-th geometry processing pipeline to accept new input geometry data, $S_{outi}$ denotes the capability for the i-th geometry processing pipeline to accept output geometry data during geometry transformation and other pipeline stages, and m denotes the number of geometry processing pipelines that the j-th core comprises.

9. The graphics processing system of claim 1, wherein the input assembler module of the master mode core is configured to add a core group index to each of the primitive core groups, and the tiling display lists contain the core group indexes.

10. The graphics processing system of claim 9, wherein the geometry processing pipeline of each of the multiple cores comprises a geometry transformation module, a clipping and culling module, and a data receiving module, wherein the geometry transformation module of each of the multiple cores is configured to process the distributed primitive core groups to transform vertex data of the primitives into the screen view space;

the clipping and culling module of each of the multiple cores is configured to update the primitive core groups by removing primitives invisible in the screen view space; and the data receiving module of each of the multiple cores is configured to receive and store the updated primitive core groups and the transformed vertex data.

11. The graphics processing system of claim 9, wherein the fragment processing system of each of the multiple cores comprises a tile processing module, wherein the tile processing module is configured to acquire the tiling display lists from the master mode core and the at least one slave mode core, and merge the acquired tiling display lists into one single tiling display list in an original distribution order for each tile according to the core group indexes in the acquired tiling display lists.

12. The graphics processing system of claim 11, wherein the core group indexes are configured to split a stream of the constructed primitives into the primitive core groups, and the core group indexes are incremental integers; the tile processing module is configured to keep tracking core group indexes in all the tiling display lists, take a tiling display list with the lowest core group index value as a current tiling display list, and process the current tiling display list until a next tiling display list entry of the current tiling display list is either a new core group index entry or a terminator entry;

in response to a new core group index entry appearing in the current tiling display list, the tile processing module is further configured to compare the values of the core group indexes in all the tiling display lists, take a tiling display list currently with the lowest core group index value as a current tiling display list, and process the current tiling display list until a next tiling display list entry of the current tiling display list is either a new core group index entry or a terminator entry; and in response to a terminator entry appearing in the current tiling display list, the tile processing module is further configured to compare the values of core group indexes in all the other tiling display lists, take a tiling display list currently with the lowest core group index value as a current tiling display list, and process the current tiling display list until a next tiling display list entry of the current tiling display list is either a new core group index entry or a terminator entry.

13. The graphics processing system of claim 9, wherein the fragment processing system of each of the multiple cores further comprises a rasterization module, a hidden surface removal module, a pixel shading module, and a post-processing module, wherein the rasterization module is configured to rasterize primitives referenced in the merged tiling display list into visible pixels;

the hidden surface removal module is configured to perform a depth test by comparing depth values of the primitive pixels output by the corresponding rasterization module with depth values of previous primitive pixels, and remove a primitive pixel when the primitive pixel is hidden by the previous primitive pixel, or otherwise, send the primitive pixel to the corresponding pixel shading module;

the pixel shading module is configured to shade the primitive pixels output by the corresponding hidden surface removal module;

the post-processing module is configured to perform post-processing operations, which involve at least accumulation, on colors generated from the shaded primitive pixels; and the fragment processing system is configured to generate a final rendered image for each tile after processing all the primitives in the merged tiling display list.

14. A graphics processing method, comprising:
constructing primitives according to input geometry data, and splitting the constructed primitives into primitive core groups;
distributing the primitive core groups to multiple cores; and
processing the distributed primitive core groups in the multiple cores, respectively, to obtain a rendered image, comprising:
processing the distributed primitive core groups to have all primitives of the primitive core groups are in screen view space;
tiling the processed primitive core groups into multiple tiles in the screen view space and generating a tiling display list for each tile in each of the multiple cores;
merging, for each tile, the tiling display lists generated in the multiple cores into one single tiling display list; and
rendering the tile according to the merged tiling display list to obtain the rendered image.

15. The graphics processing method of claim 14, wherein the splitting the constructed primitives into primitive core groups comprises: adding a core group index to each of the primitive core groups; and the merging, for each tile, tiling display lists generated in the multiple cores into one single tiling display list comprises: acquiring the tiling display lists generated in the multiple cores; and merging the acquired tiling display lists into one single tiling display list in an original distribution order according to core group indexes in the acquired tiling display lists.

16. The graphics processing method of claim 14, wherein the rendering the tile according to the merged tiling display list to obtain the rendered image comprises: rasterizing primitives referenced in the merged tiling display list into visible pixels; performing a depth test by comparing depth values of the primitive pixels with depth values of previous primitive pixels, and removing the primitive pixels hidden by the previous primitive pixels; shading the remaining primitive pixels; and
performing post-processing operations, which involve at least accumulation, on colors generated from the shaded primitive pixels.

17. The graphics processing method of claim 14, wherein the splitting the constructed primitives into primitive core groups comprises:

closing a current primitive core group and starting a new primitive core group in response to a predefined condition being satisfied, wherein
the predefined condition is that the number of primitives in the current primitive core group reaches a predefined core group primitive limit, or the value of the core group primitive limit is changed, or the number of geometry tasks in the current primitive core group reaches a predefined core group geometry task limit, or the value of the core group geometry task limit is changed.

18. A graphics processing system comprising multiple cores with a master mode core and at least one slave mode core, wherein:
the master mode core is configured to construct primitives according to input geometry data, split the constructed primitives into primitive core groups, and distribute the primitive core groups to the master mode core and the at least one slave mode core; and the master mode core and the at least one slave mode core are configured to process the distributed primitive core groups to obtain a rendered image; and
each of the primitive core groups is distributed to the core with the greatest combined weight factor among the multiple cores, wherein the combined weight factor of a j-th core is $W_j = k_{jin} * W_{jin} + k_{jout} * W_{jout}$, where $W_{jin}$ denotes a weight factor of the j-th core from vertex input capability of the at least one geometry processing pipeline, $W_{jout}$ denotes a weight factor of the j-th core from vertex output capability of the at least one geometry processing pipeline, and $k_{jin}$ and $k_{jout}$ denote predefined coefficients for $W_{jin}$ and $W_{jout}$, respectively.

19. The graphics processing system of claim 18, wherein $W_{jin} = \Sigma_{i=1}^{i=m} S_{ini}$, and $W_{jout} = \Sigma_{i=1}^{i=m} S_{outi}$, wherein $S_{ini}$ denotes the capability for an i-th geometry processing pipeline to accept new input geometry data, $S_{outi}$ denotes the capability for the i-th geometry processing pipeline to accept output geometry data during geometry transformation and other pipeline stages, and m denotes the number of geometry processing pipelines that the j-th core comprises.

20. The graphics processing system of claim 18, wherein each of the multiple cores comprises a geometry processing system and a fragment processing system, wherein the geometry processing system of each of the multiple cores is configured to process the distributed primitive core groups to generate tiling display lists for tiles; and for each tile, the fragment processing system of each of the multiple cores is configured to merge the tiling display lists generated by the geometry processing systems of the multiple cores into one single tiling display list, and render the tile according to the merged tiling display list to obtain the rendered image.

* * * * *